Patented Dec. 16, 1930 1,785,166

UNITED STATES PATENT OFFICE

CHARLES O. YOUNG, OF JACKSON HEIGHTS, NEW YORK, ASSIGNOR TO CARBIDE & CARBON CHEMICALS CORPORATION, A CORPORATION OF NEW YORK

MANUFACTURE OF ESTERS FROM ALDEHYDES

No Drawing. Application filed July 14, 1925. Serial No. 43,616.

This invention relates to improvements in the manufacture of esters by condensation or polymerization of aldehydes and to a new and improved catalyst for use in such manufacture.

The invention has for one of its principal objects a process of making esters whereby high yields are obtained.

This invention has for a further object the production of a catalyst which permits the esterification to be carried on under better temperature control, which may be free from added foreign salts or impurities, and which may be prepared more easily than the catalysts heretofore employed.

Further objects of the invention will appear as the description proceeds.

The reaction which takes place in the condensation or polymerization of aldehydes to esters may be illustrated by the following equation:

$$2R.CHO = R.CO.OCH_2.R$$

where R represents either an alkyl or aryl residue.

It has been heretofore proposed to use as a catalyst aluminum ethoxide, either alone or mixed with other materials such as aluminum chloride, potassium alum, copper sulfate, etc. This catalyst is usually either introduced in a molten condition into the aldehyde or dissolved in a solvent such as xylene, ethyl acetate, etc. and then mixed with the aldehyde. However, the comparatively high melting point and low solubility of aluminum ethoxide render it difficult to operate the process at the most suitable temperature, which in the case of ethyl acetate is preferably between $-10°$ C. and $+10°$ C. Where additional materials of the kinds above mentioned are used with the ethoxide undesired impurities are introduced into the product.

I have found that aluminum butoxide may readily be prepared in a substantially pure state and that when used as a catalyst in preparing esters of the classes above described it has a number of marked advantages over the ethoxide. Among these may be mentioned its lower melting point and higher solubility which allow it to be introduced into the reaction mixture at a lower temperature and in more concentrated solution than is possible with the ethoxide with consequent better control of the reaction temperature. It is also more active than the ethoxide and for that reason the esterification takes place more quickly. In contradistinction to ethyl alcohol, butyl alcohol is easily obtained in an anhydrous condition and is more reactive with aluminum than is ethyl alcohol. Consequently the butoxide is prepared more easily than the ethoxide.

In a specific example, aluminum butoxide, either in a molten state or in the form of a solution in ethyl acetate, is slowly added in the proportion of 2 to 5 percent to pure anhydrous acetaldehyde, while the temperature of the reaction mixture is maintained between $-10°$ C. and $+10°$ C. As soon as the reaction is completed, water or acetic acid in amount not greater than that theoretically necessary to decompose the catalyst is added to the reaction mixture to render it inactive. The mixture is then rectified and the ethyl acetate is obtained in a practically pure state. The yield is approximately 90% of theory with about 10% of a resinous material as a by-product.

I have found that the yield is improved by the use of anhydrous aldehyde of the highest purity. Even the product ordinarily sold as chemically pure aldehyde contains sufficient impurities, such as water and acetic acid, to react with the catalyst and lessen its activity. To minimize undesired reactions I prefer to maintain a dry neutral or reducing atmosphere in the reaction zone, for example by passing dry nitrogen or hydrogen through the reaction chamber.

I also consider it important to inhibit the activity of the catalyst as soon as the esterification is complete, since otherwise further condensation reactions take place with resulting reduction in yield of ester.

The procedure outlined in the two preceding paragraphs is not limited to a process in which aluminum butoxide is used as the catalyst but may be followed with advantage where other known catalysts are used.

According to the preferred method of preparing my new catalyst, finely divided aluminum is brought into contact with substantially anhydrous butyl alcohol. About 1% of preformed aluminum butoxide is added to initiate the reaction, which proceeds according to the following equation:

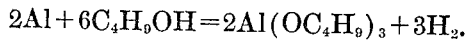

$$2Al + 6C_4H_9OH = 2Al(OC_4H_9)_3 + 3H_2.$$

When the aluminum is all dissolved the excess alcohol, if any, is distilled off and the butoxide is obtained as a thick liquid which solidifies on cooling. I prefer to use the proportions of butyl alcohol and aluminum which are theoretically required to form the butoxide and to use the reaction mixture as a catalyst as soon as the aluminum has all reacted, although the use of an excess of alcohol in preparing the catalyst is not precluded.

The use of preformed reaction product to initiate the reaction between the alcohol and aluminum is a novel feature of my invention, and may be applied to the preparation of other aluminum alcoholates, as for example, the ethoxide and the isopropoxide. Heretofore the reaction between the aluminum and the alcohol has been initiated by the use of starting materials such as aluminum chloride, ferric oxid, etc. Such materials are difficult to remove from the alcoholate, and tend, if present, to promote undesirable side reactions.

While I have described the use of aluminum butoxide as a catalyst in the preparation of ethyl acetate it is to be understood that it may be used in preparing other esters of the aliphatic and aromatic groups. For example good yields of butyl butyrate from butyraldehyde, and of benzyl benzoate from benzaldehyde, have been obtained with the use of aluminum butoxide as a catalyst. Mixed esters may also be prepared from mixtures of aldehydes. For example, ethyl butyrate and butyl acetate have been prepared from a mixture of acetaldehyde and butyraldehyde.

I claim:

1. Process of making esters which comprises bringing an aldehyde into contact with aluminum butoxide as a catalyst.

2. Process of making esters which comprises bringing an aldehyde into contact with a catalyst comprising aluminum butoxide substantially free from impurities such as water or acetic acid.

3. Process of making ethyl acetate which comprises bringing acetaldehyde into contact with aluminum butoxide.

4. Process of making esters which comprises bringing a substantially pure anhydrous aldehyde into contact with a catalyst comprising aluminum butoxide substantially free from impurities.

5. Process of making fatty acid esters which comprises bringing a substantially pure anhydrous aldehyde into contact with a catalyst comprising aluminum butoxide substantially free from hydrolizing impurities.

6. Process of making ethyl acetate which comprises bringing acetaldehyde, free from water and acetic acid, into contact with aluminum butoxide as a catalyst while maintaining the reaction mixture at a temperature of from $-10°$ C. to $+10°$ C.

7. Process of making ethyl acetate which comprises bringing substantially pure anhydrous acetaldehyde into contact with aluminum butoxide as a catalyst while maintaining a non-oxidizing atmosphere in the reaction zone.

8. Process of making esters which comprises bringing a substantially pure anhydrous aldehyde into contact with aluminum butoxide as a catalyst.

9. Process of making esters which comprises bringing an aldehyde into contact with an aluminum alkoxy compound as a catalyst, and, as soon as esterification is complete, decomposing the catalyst.

10. Process of making mixed esters which comprises bringing a mixture of two or more aldehydes into contact with aluminum butoxide as a catalyst.

11. Process of making mixed esters which comprises bringing a mixture of two or more aldehydes, substantially free from water and acid, into contact with an aluminum alkoxy compound as a catalyst, said compound being substantially free from hydrolizing impurities.

In testimony whereof, I affix my signature.

CHARLES O. YOUNG.